US012246202B1

(12) United States Patent
Lee et al.

(10) Patent No.: US 12,246,202 B1
(45) Date of Patent: Mar. 11, 2025

(54) SCREEN-TYPE ELECTRIC VEHICLE FIRE SUPPRESSION DEVICE

(71) Applicant: GEOSAN E&G Co., Ltd., Gwangmyeong-si (KR)

(72) Inventors: Yong Chul Lee, Incheon (KR); Kwang Kyu Lee, Paju-si (KR)

(73) Assignee: GEOSAN E&G Co., Ltd., Gwangmyeong-si (KR)

( * ) Notice: Subject to any disclaimer, the term of this patent is extended or adjusted under 35 U.S.C. 154(b) by 0 days.

(21) Appl. No.: 18/912,267

(22) Filed: Oct. 10, 2024

(30) Foreign Application Priority Data

Oct. 11, 2023 (KR) ........................ 10-2023-0134763

(51) Int. Cl.

| | |
|---|---|
| ***A62C 3/07*** | (2006.01) |
| ***A62C 2/08*** | (2006.01) |
| ***A62C 2/10*** | (2006.01) |
| ***A62C 35/13*** | (2006.01) |
| *A62C 2/06* | (2006.01) |

(52) U.S. Cl.

CPC .................. *A62C 3/07* (2013.01); *A62C 2/08* (2013.01); *A62C 2/10* (2013.01); *A62C 35/13* (2013.01); *A62C 2/06* (2013.01)

(58) Field of Classification Search

CPC .. A62C 35/13; A62C 3/07; A62C 2/06; A62C 2/08; A62C 2/10

USPC ...................................................... 161/61, 62

See application file for complete search history.

(56) References Cited

U.S. PATENT DOCUMENTS

| | | | | |
|---|---|---|---|---|
| 4,398,371 A * | 8/1983 | Jenkins | A62C 2/12 | 49/7 |
| 6,070,640 A * | 6/2000 | Miyagawa | A62C 2/10 | 160/25 |
| 6,357,507 B1 * | 3/2002 | Stoebich | E06B 9/56 | 160/44 |
| 2010/0269449 A1 * | 10/2010 | Bush | A62C 2/06 | 428/312.6 |
| 2016/0193488 A1 * | 7/2016 | Cooper | E06B 9/56 | 169/48 |
| 2016/0265269 A1 * | 9/2016 | Cooper | E06B 5/16 | |
| 2021/0038932 A1 * | 2/2021 | Hutton | A62C 3/0257 | |

FOREIGN PATENT DOCUMENTS

| | | | |
|---|---|---|---|
| KR | 102714492 B1 | * | 3/2020 |
| KR | 20230111779 A | * | 1/2022 |
| KR | 20230123542 A | * | 2/2022 |
| KR | 10-2431474 B1 | | 8/2022 |
| KR | 102503331 B1 | * | 10/2022 |
| KR | 20240098370 A | * | 12/2022 |
| KR | 20240101235 A | * | 12/2022 |
| KR | 20240124461 A | * | 2/2023 |

(Continued)

*Primary Examiner* — Qingzhang Zhou
*Assistant Examiner* — Anna Thi Ho
(74) *Attorney, Agent, or Firm* — Bridgeway IP Law Group, PLLC; Jihun Kim

(57) ABSTRACT

Embodiments relate to a screen-type fire suppression system for an electric vehicle, and more particularly, to a screen-type fire suppression system for an electric vehicle which, in the event of a fire in a parked electric vehicle, unfolds a screen on the sides of the electric vehicle to prevent the spread of the fire and simultaneously increase the concentration of water sprayed onto the electric vehicle, thereby maximizing fire suppression efficiency.

6 Claims, 6 Drawing Sheets

(56) References Cited

FOREIGN PATENT DOCUMENTS

| | | | | | |
|---|---|---|---|---|---|
| KR | 20240132646 | A | * | 2/2023 | |
| KR | 102681724 | B1 | * | 3/2023 | |
| KR | 102669826 | B1 | * | 6/2023 | |
| KR | 10-2565044 | B1 | | 8/2023 | |
| KR | 10-2023-0138746 | A | | 10/2023 | |
| WO | WO-2018222046 | A1 | * | 12/2018 | ............... A62C 3/07 |

* cited by examiner

SCREEN-TYPE ELECTRIC VEHICLE FIRE SUPPRESSION DEVICE

TECHNICAL FIELD

The present disclosure relates to a screen-type fire suppression system for an electric vehicle, and more particularly, to a screen-type fire suppression system for an electric vehicle which, in the event of a fire in a parked electric vehicle, unfolds a screen on the sides of the electric vehicle to prevent the spread of the fire and simultaneously increase the concentration of water sprayed onto the electric vehicle, thereby maximizing fire suppression efficiency.

DESCRIPTION OF THE RELATED ART

In recent years, electric vehicles have been rapidly adopted, and the number of electric vehicle charging stations has gradually increased. However, electric vehicles often catch fire during charging at charging stations, which has become a social issue. In particular, if a fire breaks out in an underground parking garage, the rapidly increasing toxic gases and the spread of fire in a confined space may pose a deadly threat to residents.

For a fire in an electric vehicle, it is impossible to extinguish the fire by using a conventional automatic fire extinguishing system (sprinkler) or fire extinguisher due to the rapid occurrence of flashover and the inability of a fire extinguishing agent to reach a battery mounted on a lower portion of a vehicle body.

To resolve these issues, Korean Patent No. 10-2431474 proposes a method for extinguishing a fire, which involves forming a water tank and immersing the battery in water filled within the water tank. However, the conventional water tank formation apparatus has a complex installation structure, resulting in high production costs. In addition, a large quantity of water is required to fill an entire tube, leading to further cost issues. Furthermore, the time taken to fill the water tank to immerse the battery makes the conventional apparatus ineffective.

RELATED ART DOCUMENT

Patent Document

PATENT DOCUMENT 1: Korean Patent No. 10-2431474

SUMMARY

The present disclosure relates to a screen-type fire suppression system for an electric vehicle, and more particularly, to a screen-type fire suppression system for an electric vehicle which, in the event of a fire in a parked electric vehicle, unfolds a screen on the sides of the electric vehicle to prevent the spread of the fire and simultaneously increase the concentration of water sprayed onto the electric vehicle, thereby maximizing fire suppression efficiency.

The screen-type fire suppression system for an electric vehicle according to the present disclosure includes: a frame positioned to have a predetermined height in a vertical direction from a ground surface of a parking area; a screen coupled to the frame and configured to be unfolded downward in the vertical direction; and a cooler positioned above the frame in the vertical direction, wherein when a fire breaks out in an electric vehicle parked in the parking area, the screen is unfolded to surround both sides of the electric vehicle and water is sprayed through the cooler to suppress the fire in the electric vehicle.

In addition, in the screen-type fire suppression system for an electric vehicle according to the present disclosure, the screen is unfolded to surround both sides and front and rear portions of the electric vehicle.

In addition, the screen-type fire suppression system for an electric vehicle according to the present disclosure further includes a tube embedded in the ground surface of the parking area; when a fire breaks out in the electric vehicle parked in the parking area, the tube expands and surrounds both sides of the electric vehicle.

In addition, in the screen-type fire suppression system for an electric vehicle according to the present disclosure, water is controlled to be sprayed through the cooler after the tube expands and surrounds both sides of the electric vehicle.

In addition, in the screen-type fire suppression system for an electric vehicle according to the present disclosure, the tube is embedded in a step vertically recessed downward from the ground surface of the parking area.

In addition, in the screen-type fire suppression system for an electric vehicle according to the present disclosure, the frame is fixed, through a bolt, to a ceiling of the parking area.

In addition, in the screen-type fire suppression system for an electric vehicle according to the present disclosure, the frame is fixed, through a bolt, to a structure formed on the ground surface of the parking area and configured to extend in the vertical direction.

The present disclosure enables the most effective fire suppression method to be established by spraying water directly onto the electric vehicle in which a fire breaks out.

In addition, the present disclosure creates a configuration similar to spraying water into a partition wall formed by the screen, resulting in the concentrated spraying of water onto the electric vehicle and the blocking of oxygen by the partition wall, thereby boosting fire suppression efficiency.

In addition, the present disclosure forms a double partition wall through the tube and the screen to minimize water outflow, thereby enhancing fire suppression concentration. In addition, unlike a conventional system, the double partition wall effect eliminates the need to manufacture the tube to expand to a height of a vertical end of the electric vehicle, thereby reducing costs.

In addition, miniaturization is achievable, and the fire suppression system according to the present disclosure does not require much space for installation in an actual parking area, thereby demonstrating practicality.

DESCRIPTION OF SPECIFIC EMBODIMENTS

Various embodiments of the present disclosure will be described in detail below with reference to the accompanying drawings.

A fire suppression system according to the present disclosure includes a first suppressor 100, a cooler 200, and a third suppressor 400.

First, the fire suppression system according to the present disclosure is installed in an electric vehicle parking area. In the electric vehicle parking area, a charger is typically installed and as described above, a fire may break out.

Figure 1:
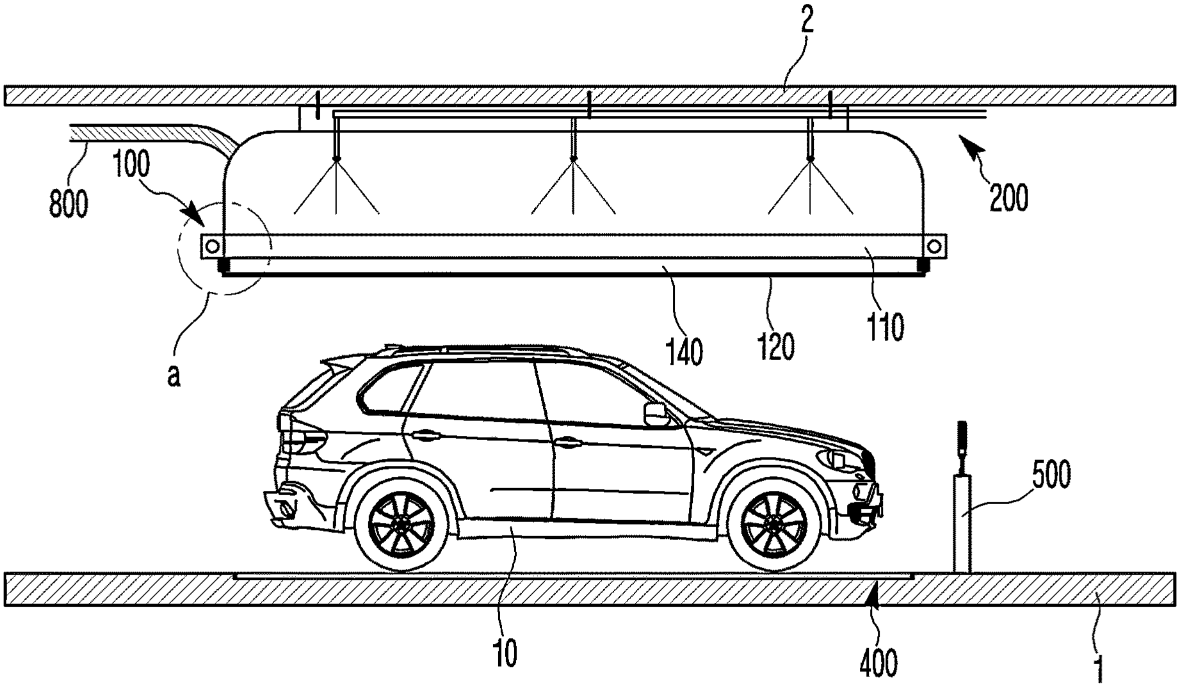
FIG. 1 is a side view illustrating a fire suppression system according to one embodiment of the present disclosure.
Figure 2:
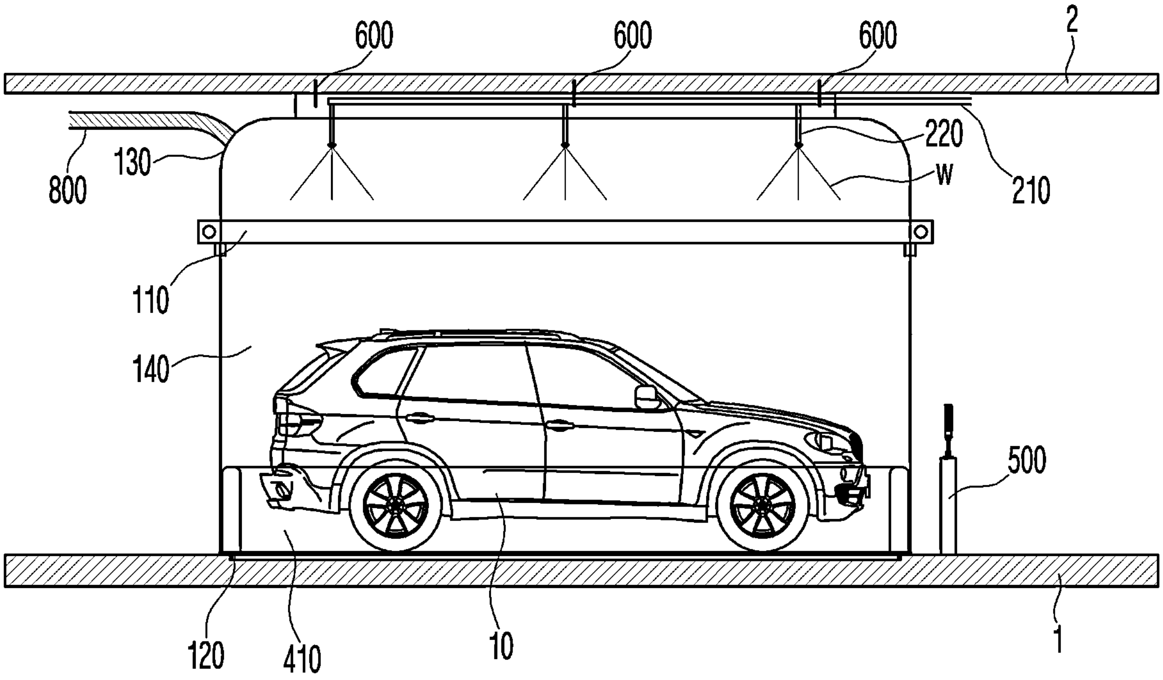
FIG. 2 is a view illustrating the fire suppression system in operation according to one embodiment of the present disclosure.
Figure 3:
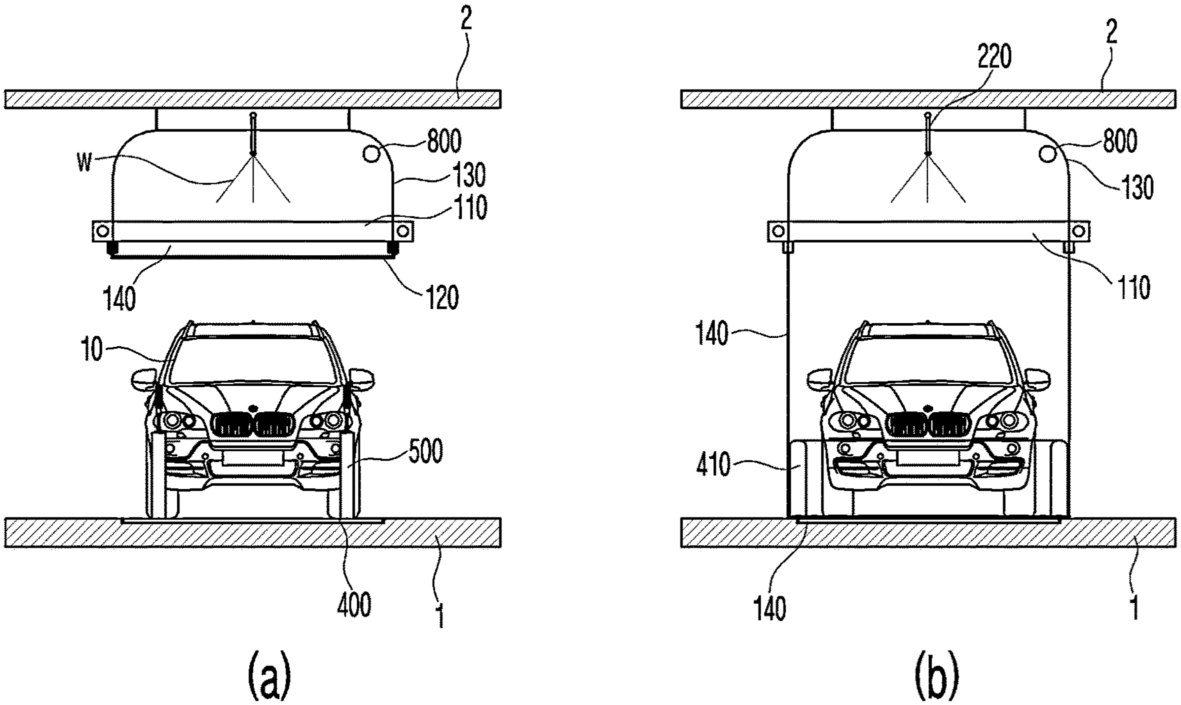
FIG. 3 is a view illustrating the fire suppression system in FIGS. 1 and 2, when viewed from the front, respectively.

FIG. 1 is a side view illustrating a fire suppression system according to one embodiment of the present disclosure. FIG. 2 is a view illustrating the fire suppression system in operation according to one embodiment of the present disclosure. FIG. 3 is a view illustrating the fire suppression system in FIGS. 1 and 2, when viewed from the front, respectively. For convenience of description, the parking area includes a ground surface 1 and a ceiling 2.

The first suppressor 100, in turn, includes a frame 110, a support 120, an auxiliary frame 130, and a screen 140.

The frame 110 is positioned to have a predetermined height in a vertical direction from the ground surface 1. In this case, the auxiliary frame 130 is formed to extend from an upper portion of the frame 110, and the auxiliary frame 130 is preferably installed by being fixed, through a bolt 600, to the ceiling 2. The bolt 600 may be, for example, an anchor bolt. This allows the frame 110 to be installed by using only the bolt 600, without an additional installation member, thereby reducing the installation difficulty for an operator.

More specifically, the frame 110 is preferably configurated as a square frame with a hollow portion formed therein. Thus, the frame 110 is preferably formed in a configuration that surrounds both sides and front and rear portions of an electric vehicle 10 in the parking area (strictly speaking, a configuration in which the screen 140 extending from a lower portion of the frame 110 surrounds both sides and front and rear portions of the electric vehicle 10).

The support 120 is located on the frame 110, and the screen 140 is formed between the frame 110 and the support 120. Thus, an upper portion of the screen 140 is coupled to the frame 110, and a lower portion of the screen 140 is coupled to the support 120.

Figure 4:
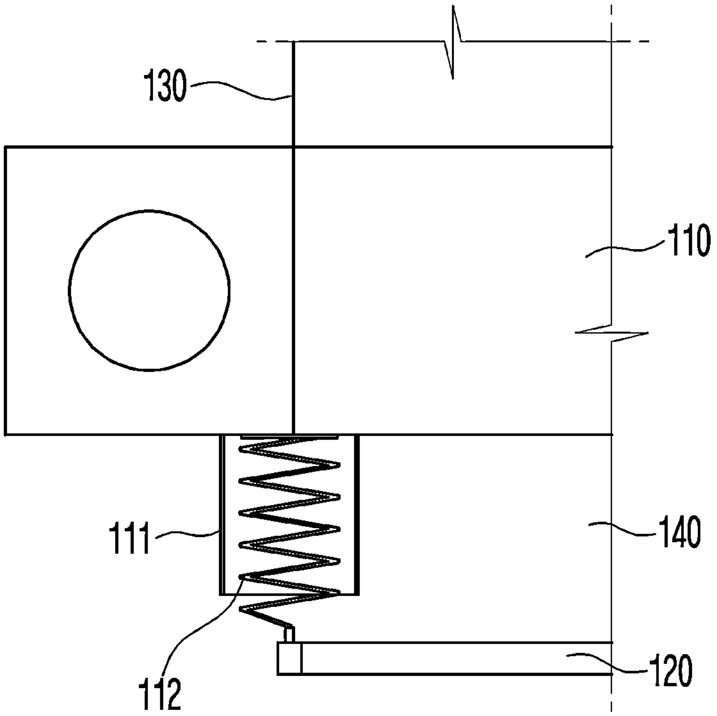
FIG. 4 is an enlarged view of section “a” in FIG. 1.

In this case, the support 120 may descend in a vertical direction with respect to the frame 110. FIG. 4 is referenced for a description of this. FIG. 4 is an enlarged view of section "a" in FIG. 1.

At each corner of the frame 110, a connector 111 is formed to extend downward in a vertical direction and protrude therefrom, and a spring 112 is positioned in the connector 111. An upper end of the spring 112 is coupled to the frame 110, and a lower end of the spring 112 is coupled to the support 120. Thus, before the screen 140 is unfolded, the connector 111 and the support 120 are coupled (illustrated as being spaced apart a certain distance from each other in FIG. 4 for convenience of description). In addition, the screen 140 is folded in a space between the frame 110 and the support 120, and the spring 112 is contracted.

In this case, the connector 111 and the support 120 are magnetically coupled. In addition, as will be described later, the magnetic coupling is adjusted to an on/off state, and in an off state, the support 120 is detached from the connector 111.

Due to the contraction of the spring 112 described above, a pulling force is generated in a vertical direction from downward to upward, which enhances a coupling strength between the connector 111 and the support 120, thereby minimizing the occurrence of unfolding of the screen 140 due to a malfunction before the screen 140 is intended to unfold.

As an example of magnetic coupling, the support 120 may be made of a magnetic material, and a control structure that may regulate an electrical flow may be formed in the connector 111 to establish a coupling configuration.

Thus, when a fire detection sensor (not illustrated) detects a fire in an electric vehicle, the electrical flow is controlled to be cut off and switches from an on state to an off state, thereby causing the support 120 to be detached from the connector 111. In this case, the support 120 descends in a vertical direction by gravity, and the screen 140, which has been folded, is unfolded to form a shape shown in FIG. 2.

In this case, the spring 112 performs a role as a damper to prevent a rapid descent of the screen 140, thereby minimizing the probability of the support 120 colliding with the ground surface 1 and being damaged. This is because, without the role as a damper, the support 120 may collide with the ground surface 1 and be damaged, and the structure in which the screen 140 surrounds the electric vehicle 10 may not be established.

As described above, when the screen 140 is unfolded, the screen 140 is formed to surround both sides and front and rear portions of the electric vehicle 10 in which a fire breaks out. Thus, the screen 140 may quickly prevent the fire from spreading beyond the parking area, and may block the airflow to prevent the flames from intensifying. The screen 140 is preferably made of, for example, a flame-retardant, fire-resistant material.

In addition, water is sprayed from the cooler 200 to suppress the fire.

The cooler 200 includes a pipe 210 and a nozzle 220. The pipe 210 is preferably formed to extend along the ceiling 2, and is preferably interconnected with an external water tank to receive water. The pipe 210 may be fixed, through the bolt 600, to the ceiling 2.

A plurality of the nozzles 220 are coupled at a plurality of points of the pipe 210, respectively. As a result, water W flowing into the pipe 210 is sprayed, through the nozzle 220, downward in the vertical direction. More specifically, the nozzle 220 is positioned upward in a vertical direction of the frame 110, but is preferably positioned to spray the water W into the frame 110. The spraying of the water W is preferably turned on/off through the fire detection mechanism described above.

In this case, an exhaust outlet 800 may be coupled at one point of the auxiliary frame 130. Smoke produced in the event of a fire, or smoke produced after fire suppression may be discharged through the exhaust outlet 800. The exhaust outlet 800 is preferably designed to communicate with a building's exhaust outlet (not illustrated) such that smoke may be discharged to the outside. The exhaust outlet 800 may be, for example, in the form of bellows, which enables easy shape adjustment and reduces limitations on the installation location of the exhaust outlet 800.

Such a configuration has the following effects.

First, the most effective fire suppression method may be established by spraying water directly onto the electric vehicle 10 in which a fire breaks out.

Next, the water is sprayed into the frame 110 as described above, and the sprayed water is also sprayed into a partition wall formed by the screen 140, thereby creating a configuration similar to spraying water into a water tank formed by the screen 140 and resulting in the concentrated spraying of water onto the electric vehicle 10 (e.g., the water reflected from the screen 140 is directed back to the electric vehicle 10, thereby maximizing fire suppression efficiency).

Finally, as will be described later, the suppression effect is maximized through the synergistic effect with the third suppressor 400, which will be described later.

Next, the third suppressor 400 will be described.

Figure 5:
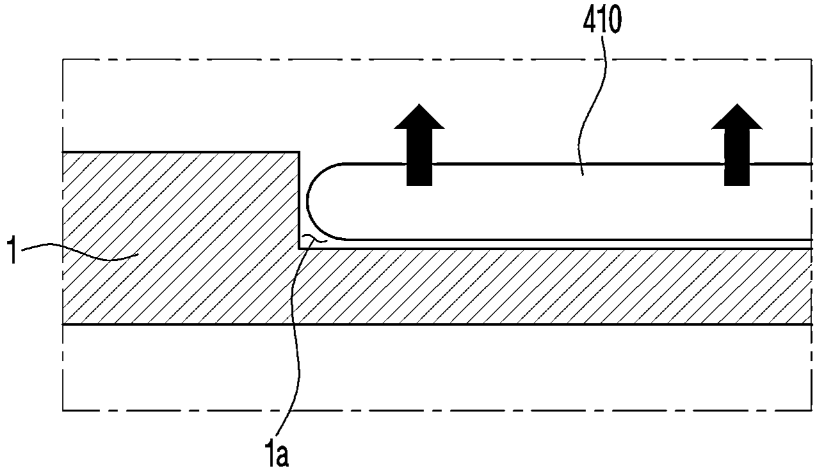
FIG. 5 is a view illustrating a tube before expanding.

The third suppressor 400 includes a tube 410. FIG. 5 is a view illustrating the tube 410 before expanding.

Preferably, the ground surface 1 of the parking area on which the screen-type fire suppression system for an electric vehicle according to the present disclosure is to be installed is preferably pre-constructed such that a vertically recessed groove 1*a* is formed to form a step on the ground surface 1. The groove 1*a* is preferably formed along both sides of the parking area, and the tube 410 is embedded in the groove 1*a*. In addition, although not illustrated, a temporary cover is preferably coupled to an upper portion of the tube 410.

In addition, the screen 140 and the tube 410 are preferably installed to be arranged in the sequence of the screen 140 followed by the tube 410 from the outside to the inside, when the screen 140 described above descends. As the support 120 coupled to the lower portion of the screen 140 may ultimately not be coupled to the ground surface 1, a gap inevitably appears between the support 120 and the ground surface 1. Thus, water may be lost during the fall.

Thus, fire suppression concentration may be maximized by first confining water through the tube 410 and allowing the screen 140 to assist in preventing the outflow of falling water from the outside of the tube 410.

As described above, when a fire in the electric vehicle 10 is detected, the tube 410 is preferably controlled to expand. The tube 410 is vertically raised and expands to surround both sides of the electric vehicle 10. In the process, the temporary cover is removed due to an expansion force.

In this case, through controlling, water is preferably controlled to be sprayed after the tube 410 expands to surround both sides of the electric vehicle 10. When the tube 410 expands to form a predetermined partition wall and then water is sprayed, the outflow of water may be minimized, thereby increasing fire suppression concentration.

As described above, the present disclosure increases fire suppression concentration by minimizing the outflow of water being sprayed through the combination of the tube 410 and the screen 140. Thus, since a two-layer partition is established, there is no need to build the tube 410 to match a full vertical height of an electric vehicle, as in a related art. Thus, cost reduction is achieved compared to the related art. In addition, fire suppression concentration may be increased.

In addition, as described above, the first suppressor 100 and the cooler 200 are installed on the ceiling 2, and thus not pose any risk of obstructing the movement of the electric vehicle 10 parked in the parking area. The third suppressor 400 is embedded in a groove recessed in the parking area under normal conditions, and thus does not pose any risk of obstructing the movement of the electric vehicle 10 either. Thus, miniaturization is achievable, and the fire suppression system according to the present disclosure does not require much space for installation in an actual parking area, thereby demonstrating practicality.

Figure 6:
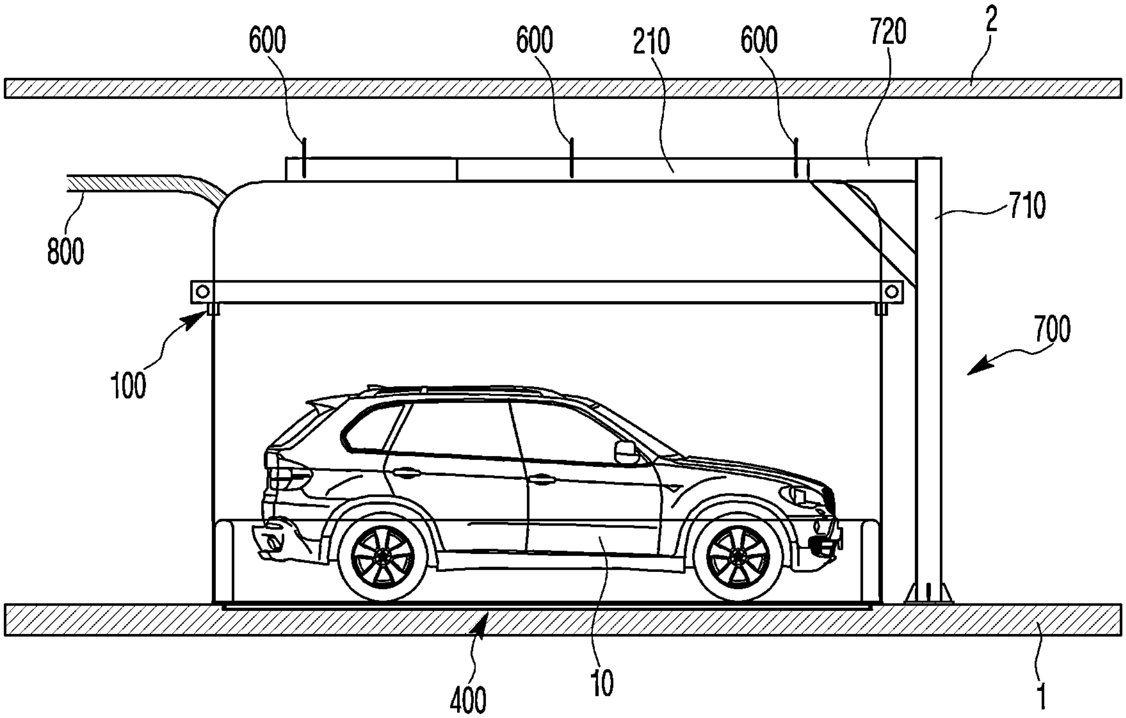
FIG. 6 is a view illustrating a fire suppression system according to another embodiment of the present disclosure.

FIG. 6 is a view illustrating a fire suppression system according to another embodiment of the present disclosure. Unlike the one embodiment, the first suppressor 100 and the cooler 200 may be installed by being coupled to a structure 700 rather than to the ceiling. To be more specific, the auxiliary frame 130 of the first suppressor 100 may be fixed, through the bolt 600, to the structure 700 installed in the form of a column in a vertical direction from the ground surface 1. At the same time, the cooler 200 may also be installed by being coupled to the structure 700. In this way, since the installation area is not necessarily limited to the ceiling 2, it is easy to install the fire suppression system according to the present disclosure in a customized manner depending on the environment.

Figure 7:
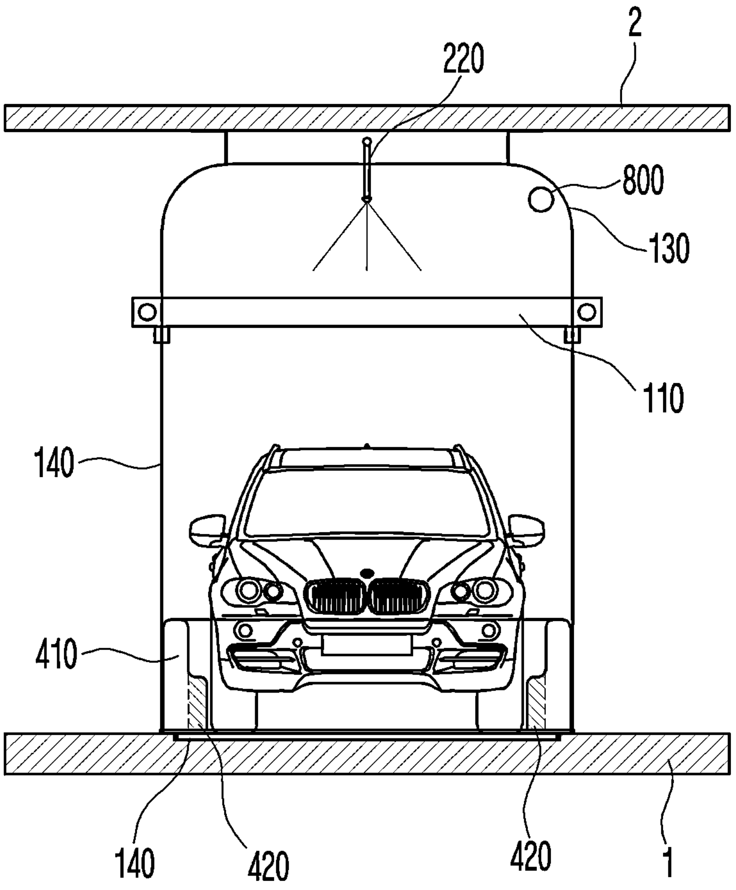
FIG. 7 is a view illustrating a fire suppression system according to yet another embodiment of the present disclosure.

FIG. 7 is a view illustrating a fire suppression system according to yet another embodiment of the present disclosure.

A fire suppression system according to yet another embodiment of the present disclosure includes a configuration of the fire suppression system according to the one embodiment, wherein an auxiliary tube 420 is formed to extend from an inner side of the tube 410. The auxiliary tube 420 is further formed on the inner side of the tube 410 toward the electric vehicle 10, wherein after an upward movement of the tube 410, the auxiliary tube 420 preferably further expands from the inner side of the tube 410, as shown in FIG. 7.

According to yet another embodiment, a space for accommodating the water W through a tube becomes smaller than in the one embodiment. Accordingly, a smaller amount of the water W flows into the space than in the one embodiment, and thus, the space may be filled with the water W more quickly than in the one embodiment. The principle of fire suppression involves filling the tube with the water W sequentially from the bottom to the top in the vertical direction until the water W comes into contact with a battery. Thus, the faster the water W fills the tube, the faster the water W comes into contact with the battery, thereby accelerating fire suppression. In addition, the amount of the water W required for fire suppression is smaller than in the one embodiment, thereby facilitating energy saving.

In this case, more preferably, the auxiliary tube 420 expands to have a lower height in the vertical direction than the tube 410, such that a stepped space in the vertical direction is formed between the tube 410 and the auxiliary tube 420. Thus, the auxiliary tube 420 and the wheels of the electric vehicle become spaced apart from each other to secure a space therebetween, thereby forming a flow path through which the falling water W may be quickly supplied to the electric vehicle 10 without being blocked by the auxiliary tube 420.

In addition, although preferred embodiments of the present disclosure have been illustrated and described above, the present disclosure is not limited to the specific embodiments described above, and various modifications may be made by those skilled in the art to which the present disclosure pertains without departing from the gist of the present disclosure as claimed in the claims. Furthermore, such modifications should not be understood individually apart from the technical spirit or perspective of the present disclosure.

What is claimed is:

1. A fire suppression system for a vehicle, the fire suppression system comprising:

a frame positioned to have a predetermined height in a vertical direction from a ground surface of a parking area;

a screen coupled to the frame;

a cooler positioned above the frame in the vertical direction;

a support coupled to a lower portion of the screen; and a tube disposed to be embedded in the ground surface of the parking area, wherein when a fire breaks out in a vehicle parked in the parking area, the screen is configured to be unfolded downward in the vertical direction to surround both sides of the vehicle, the support is configured to descend in the vertical direction with the screen, the tube is configured to expand and be raised vertically upward from the ground surface to surround both sides of the vehicle, and the cooler is configured to spray water to suppress the fire in the vehicle, wherein the screen and the tube are configured to form a two-layer partition in which the screen is disposed outside and the tube is disposed inside, wherein the frame comprises:

a connector disposed, at each corner of the frame and extending downward from each corner of the frame in the vertical direction; and a spring inserted into the connector, wherein an upper end of the spring is coupled to the frame, and a lower end of the spring is coupled to the support, wherein the support and the connector are magnetically coupled, and a magnetic coupling between the support and the connector is configured to be adjusted to an on or off state, and wherein when the fire breaks out in the vehicle parked in the parking area, the magnetic coupling between the support and the connector is configured to be converted to the off state, thereby detaching the support from the connector.

2. The fire suppression system of claim 1, wherein the screen is configured to be unfolded to surround the both sides of the vehicle and front and rear portions of the vehicle.

3. The fire suppression system of claim 1, wherein the cooler is configured to control water to be sprayed through the cooler after the tube expands and surrounds the both sides of the vehicle.

4. The fire suppression system of claim 3, wherein the tube is disposed to be embedded in a step vertically recessed downward from the ground surface of the parking area.

5. The fire suppression system of claim 1, wherein the frame is disposed to be fixed, through a bolt, to a ceiling of the parking area.

6. The fire suppression system of claim 1, wherein the frame is fixed, through a bolt, to a structure disposed to be on the ground surface of the parking area, the frame being configured to extend in the vertical direction.

* * * * *